United States Patent Office 3,102,917
Patented Sept. 3, 1963

3,102,917
THIOETHERS OF MOLECULAR WEIGHT 258.39
Walter Reifschneider, Midland, Mich., assignor to The Dow Chemical Company, Midland, Mich., a corporation of Delaware
No Drawing. Filed June 27, 1962, Ser. No. 205,513
3 Claims. (Cl. 260—609)

The present invention is directed to thioethers and in particular is directed to novel thioethers having a molecular weight of 258.39, within a tolerance of error of ±0.01, and corresponding to the formula

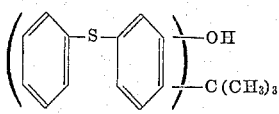

The novel compounds are colorless, oily liquids or crystalline solids appearing white in mass; very slightly soluble in water but readily soluble in various common organic solvents such as lower alkanols, benzene and the like. The compounds are useful as insecticides and herbicides, various of them are piscicides: as inhibitors of the germination of fungus spores, they are effective fungistats.

The compounds are prepared by a process which comprises the steps of causing a reaction between an aromatic halide compound corresponding to the formula

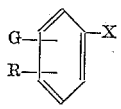

wherein X represents halogen, and a benzenethiol corresponding to the formula

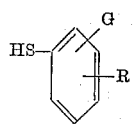

wherein one G is hydroxyl and the other is hydrogen; and one R is tert.-butyl and the other is hydrogen. During the reaction to prepare the present compounds, one molecule of thiol reacts with each molecule of aromatic halide. When it is desired to prepare the present compound in a high state of purity and with a minimum of post-synthesis purification procedure, the starting reactants should be employed in equimolecular proportions, or with the thiol in slight excess. However, other proportions may be employed if desired, and unconsumed starting material of whatever identity may, if desired, be recycled into further synthesis process.

The reaction goes forward at temperatures over a wide range such as 20° to 350° C., but initiates most readily when heated to a temperature somewhat higher than room temperature; 100° to 250° C. is a preferred range. Under these conditions the reaction is, in general, exothermic and goes forward to completion with good yield calculated upon the basis of consumed starting material. Hydrogen halide of reaction is evolved and means for its orderly disposal are advantageously provided.

Typically, in the preparation of the compounds of the present invention, reaction between the thiol starting material and the aromatic halide starting material will initiate and go forward only when there is employed a catalytic amount of both a source of cuprous ion and a nitrogenous base. Thus, in the preparation of several and probably all of the present compounds, the employment of such catalyst is essential and critical, although the exact weight is not critical. Certainly, the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than $1/100$ of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as an aromatic or aliphatic hydrocarbon oil.

In laboratory preparations, it is preferred to employ a liquid nitrogenous base catalyst substance in sufficient excess that portions of it may act as solvent, portions may act as hydrogen halide acceptor and yet further portions may continue to function, unreacted, in the necessary catalytic manner.

In carrying out the reaction to prepare the compounds of the present invention, the aromatic halide and the thiol are intimately mixed and blended, in any order and in desired amounts, with source of cuprous ion and nitrogenous base as hereinbefore described, and thereafter heated to a temperature at which reaction takes place promptly. In one convenient method the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. In any event, the product is extracted with solvent, the solvent extract dried over an inert drying agent such as, for example, anhydrous sodium sulfate or the like; the solvent vaporized and removed and the remaining product distilled; or it may be chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—4-Tertiarybutyl-2-(Phenylthio)Phenol*

A reaction mixture is prepared, consisting of 18.3 grams (0.1 mole) of 2-chloro-4-tertiarybutylphenol, 16 grams of cuprous oxide (technical grade) and 11 grams (approximately 0.1 mole) of benzenethiol dispersed in a mixture consisting of 110 milliliters quinoline and 10 milliliters lutidine. The resulting reaction mixture is placed in a flask under reflux, the reflux being equipped with a water trap. In this situation, the reaction mixture is heated at its reflux temperature (a pot temperature between approximately 200° and 240° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous sodium sulfate which also neutralizes remaining traces of acidic substances; the resulting liquid is warmed to vaporize and remove ether solvent and obtain a residual oil. This oil crystallizes upon standing; the crystals are taken up in hot ethanol and precipitated therefrom as the ethanol cools, to obtain a 4-t-butyl-2-(phenylthio)phenol as white crystals melting at 73.5°–75.5° C.

The use of a thorough wetting spray containing, as sole protective agent, 75 parts of the compound of the present example per million parts by weight of resulting aqueous spray proved quite effective in the protection of young tomato plants from subsequent infestation with a live culture of spores of Fusarium wilt, whereas untreated check plants were seriously infected.

The compound is also a selective herbicide.

*Example II.—o-(p-t-Butylphenyl-Thio)Phenol*

In procedures essentially similar to the foregoing except that the starting thiol was a p-t-butylbenzene-thiol and the aromatic halide was o-chlorophenol, there is prepared, in good yield, o-(p-t-butylphenyl-thio)phenol as a colorless liquid purified by vacuum distillation. The product boils at 175°–177° C. under absolute pressure of 3 millimeters mercury. The compound was quite effective when employed in water at a concentration of ten parts per million as a piscicide. It is also a fungicide, insecticide, and selective herbicide.

The other compounds are readily prepared in good yield in other similar preparations.

I claim:

1. A compound corresponding to the formula 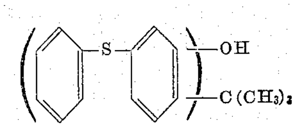 2. 4-tertiarybutyl-2-(phenylthio)phenol.
3. o-(p-tertiarybutylphenylthio)phenol.

No references cited.